United States Patent
Anglin et al.

(10) Patent No.: US 10,077,716 B2
(45) Date of Patent: Sep. 18, 2018

(54) GAS TURBINE ENGINE COUPLING STACK

(71) Applicant: UNITED TECHNOLOGIES CORPORATION, Farmington, CT (US)

(72) Inventors: Christopher T. Anglin, Manchester, CT (US); Yuk-Kwan Brian Yuen, Wethersfield, CT (US); Russell B. Witlicki, Wethersfield, CT (US); Dwayne E. Messerschmidt, Columbia, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 646 days.

(21) Appl. No.: 14/683,713

(22) Filed: Apr. 10, 2015

(65) Prior Publication Data

US 2015/0361901 A1    Dec. 17, 2015

Related U.S. Application Data

(60) Provisional application No. 61/978,041, filed on Apr. 10, 2014.

(51) Int. Cl.
*F02C 7/36*  (2006.01)
*F01D 5/02*  (2006.01)
*F02C 3/073* (2006.01)

(52) U.S. Cl.
CPC ............. *F02C 7/36* (2013.01); *F01D 5/026* (2013.01); *F02C 3/073* (2013.01); *F05D 2240/60* (2013.01); *F05D 2250/182* (2013.01); *F05D 2260/30* (2013.01); *F05D 2260/36* (2013.01); *Y02T 50/671* (2013.01)

(58) Field of Classification Search
CPC .. F02C 7/36; F02C 3/073; F02C 3/107; F01D 5/026; F01D 5/06; F05D 2240/60; F05D 2250/182; F05D 2260/30; F05D 2260/36
USPC .............................. 60/805; 415/122.1, 124.2
See application file for complete search history.

(56) References Cited

U.S. PATENT DOCUMENTS

| | | | |
|---|---|---|---|
| 7,811,052 B2* | 10/2010 | Guihard | F01D 5/026 415/122.1 |
| 8,491,267 B2* | 7/2013 | Glasspoole | F01D 5/025 416/221 |
| 2007/0212226 A1 | 9/2007 | Guihard et al. | |
| 2010/0087263 A1* | 4/2010 | Bolgar | F16D 1/108 464/158 |

(Continued)

FOREIGN PATENT DOCUMENTS

FR    2981694 A1    4/2013

OTHER PUBLICATIONS

English Translation to FR 2981694 Abstract.
European Search Report for Application No. 15163162.9 dated Aug. 12, 2015.

*Primary Examiner* — Phutthiwat Wongwian
*Assistant Examiner* — Loren Edwards
(74) *Attorney, Agent, or Firm* — Cantor Colburn LLP (57) ABSTRACT

The present disclosure relates generally a system for preventing relative rotation between three components. The three components include tabs and slots such that at least one first tab and at least one second tab on one component is disposed within at least one slot formed in the other two components to prevent relative rotation between any two of the three components.

13 Claims, 5 Drawing Sheets

(56) References Cited

U.S. PATENT DOCUMENTS

2013/0051986 A1  2/2013  Anderson et al.

* cited by examiner

GAS TURBINE ENGINE COUPLING STACK

CROSS REFERENCE TO RELATED APPLICATION

This application claims the benefit of and incorporates by reference herein the disclosure of U.S. Ser. No. 61/978,041, filed Apr. 10, 2014.

TECHNICAL FIELD OF THE DISCLOSURE

The present disclosure relates generally to a gas turbine engine, and more specifically to a coupling system which prevents rotation between components of the gas turbine engine.

BACKGROUND OF THE DISCLOSURE

A gas turbine engine typically includes a compressor which compresses air and delivers the air into a combustion section. In the combustion section air is mixed with fuel and combusted. Products of this combustion pass downstream over a turbine section. In one type of gas turbine engine, there are both low pressure and high pressure compressors, and low pressure and high pressure turbines. A "coupling stack" may attach the low pressure turbine to the low pressure compressor by means of a shaft, such that the low pressure turbine drives the low pressure compressor to rotate. A tie-bolt may connect the two, and extends along a center line axis of the gas turbine engine. The coupling stack may also include a spanner nut, and a tab lock to connect the components.

During assembly, the tie-bolt may be stretched by a tool to provide a high amount of preload pressure, or tension, to the tie-bolt. When the tool is released, the tension on the tie-bolt provides compression throughout the coupling stack. The preload pressure provides enough force throughout the coupling stack to control relative movement between the components of the coupling stack. However, during operation, vibrations may cause the components to become unspooled, or loosened, such that the components may rotate relative to each other. Unspooling between components can cause a loss of preload pressure within the coupling stack.

Figure 2A:
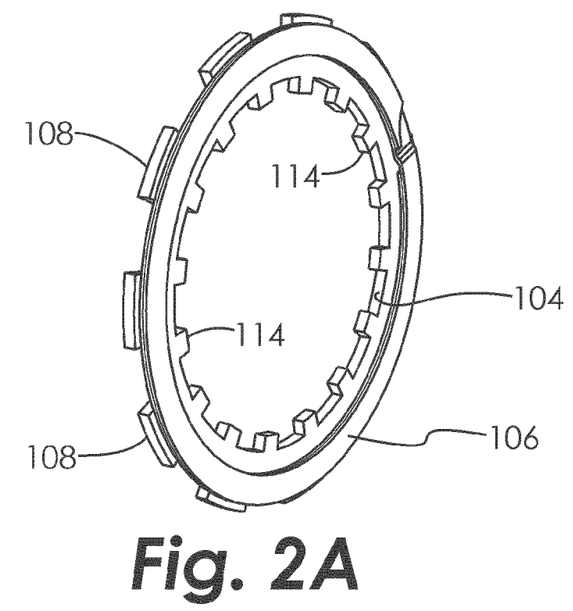
FIG. 2A is a schematic perspective view of a key washer and snap ring in an embodiment.
Figure 2B:
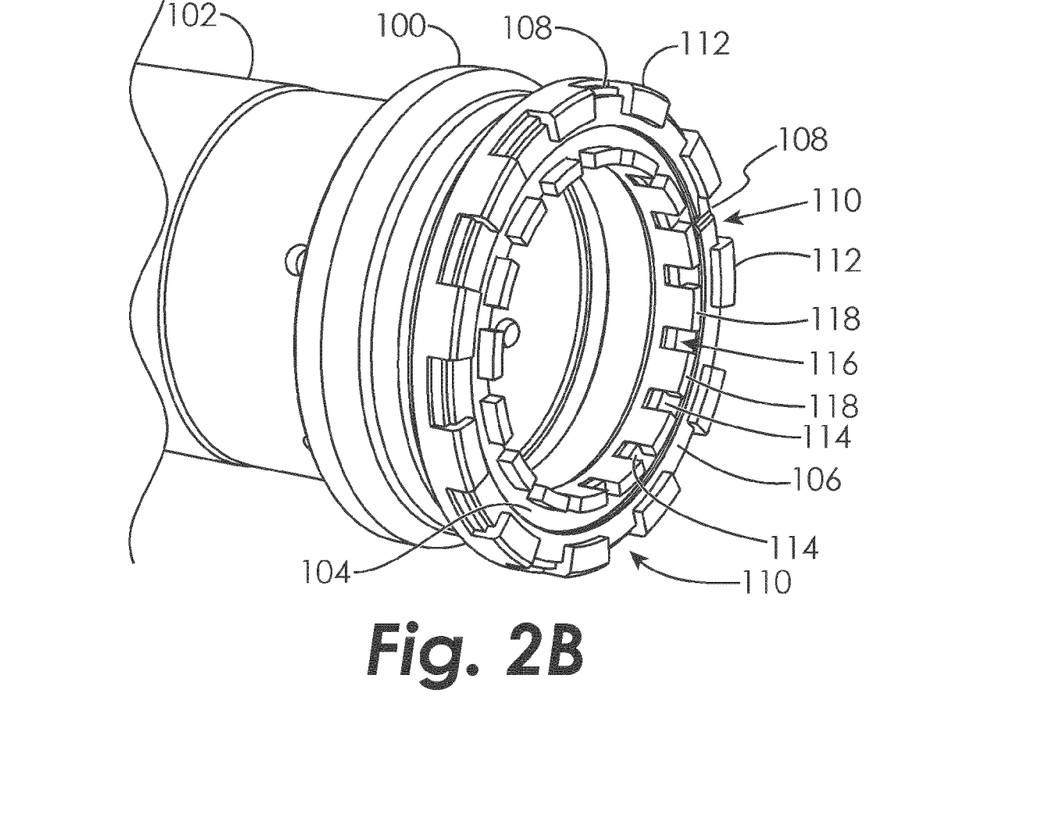
FIG. 2B is a schematic perspective view of the key washer and snap ring of FIG. 2A installed on a shaft and stack nut in an embodiment.
Figure 3:
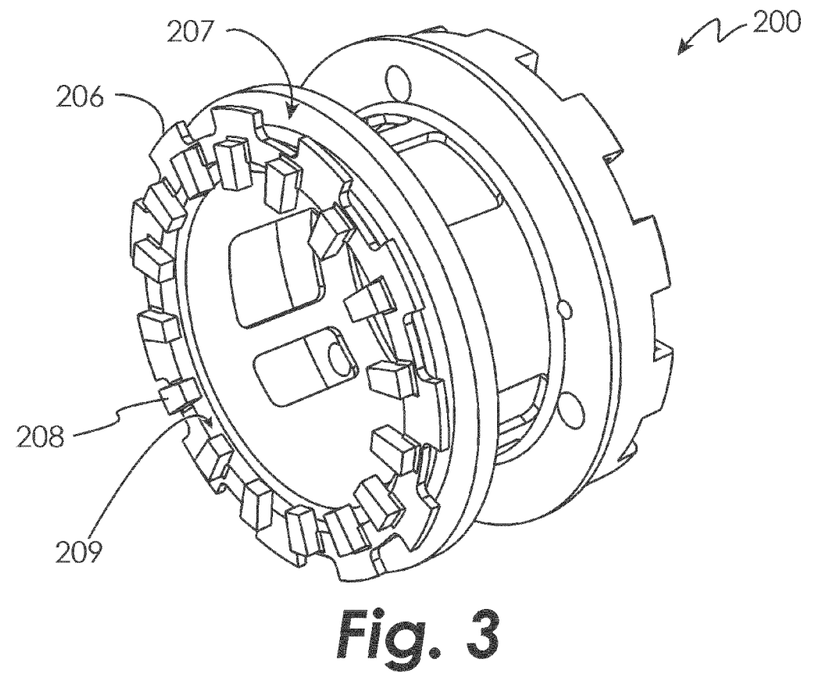
FIG. 3 is a schematic perspective view of a coupling stack component in an embodiment.
Figure 4:
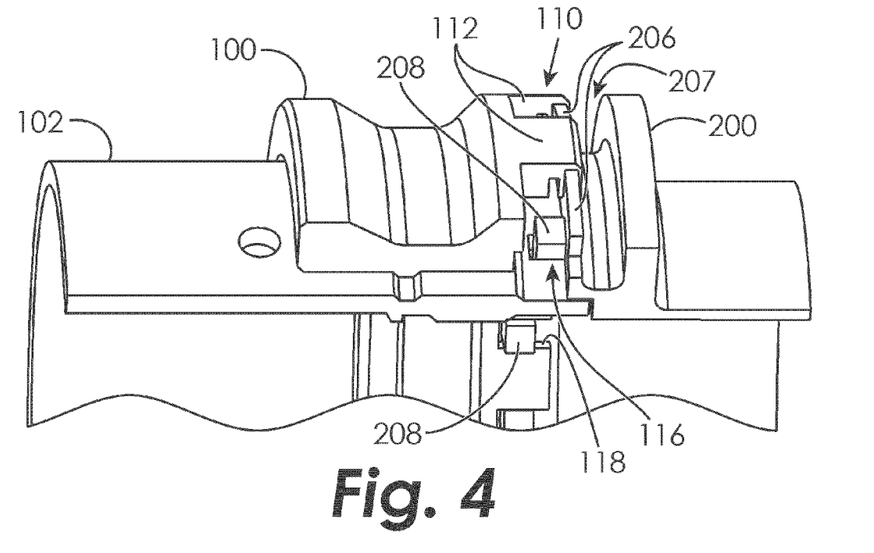
FIG. 4 is a schematic cross-sectional view of a coupling stack component engaged with a shaft and a stack nut in an embodiment.

Referring to FIGS. 2A-B, the coupling stack may also include a stack nut 100 to connect the components of the coupling stack. The stack nut 100 may be threadingly engaged with the shaft 102. A method of ensuring anti-rotation between the stack nut 100 and the shaft 102 is to deploy a key washer 104 and snap ring 106 between the stack nut 100 and the shaft 102. The key washer 104 includes a plurality of radially outer tabs 108 that are disposed within slots 110 between axial tabs 112 on the stack nut 100. The key washer 104 additionally includes radially inner tabs 114 that are disposed within slots 116 between axial tabs 118 on the shaft 102. Once the key washer 104 is installed such that the radially outer tabs 108 are disposed within the slots 110 and the radially inner tabs 114 are disposed within the slots 116, the snap ring 106 may be installed to prevent the key washer 104 from becoming disengaged from the stack nut 100 and the shaft 102. The snap ring 106 is positioned in cavities adjacent the axial tabs 112. Interference between the radially outer tabs 108 and the axial tabs 112 on the stack nut 100, as well as between the radially inner tabs 114 and the axial tabs 118 on the shaft 102, prevents relative rotation between the stack nut 100 and the shaft 102.

SUMMARY OF THE DISCLOSURE

In one embodiment, a coupling stack is disclosed comprising: a first rotating member including at least one first slot; a second rotating member including at least one second slot; a third rotating member including at least one first tab and at least one second tab, wherein the at least one first tab is axially offset from the at least one second tab; wherein engagement of the at least one first tab within the at least one first slot, and engagement of the at least one second tab within the at least one second slot, substantially prevents relative rotation between the first and second rotating member, between the second and third rotating member, and between the first and third rotating member.

In a further embodiment of the above, the first rotating member comprises a stack nut, the second rotating member comprises a shaft, and the third rotating member comprises an adjacent component.

In a further embodiment of any of the above, the adjacent component comprises a pawl carrier.

In a further embodiment of any of the above, the stack nut is threadingly engaged with the shaft.

In a further embodiment of any of the above, the at least one first slot comprises a plurality of first slots; the at least one second slot comprises a plurality of second slots; the at least one first tab comprises a plurality of first tabs; the at least one second tab comprises a plurality of second tabs; each of the plurality of first tabs is disposed in a respective one of the plurality of first slots; and each of the plurality of second tabs is disposed in a respective one of the plurality of second slots.

In a further embodiment of any of the above, the at least one first slot comprises a plurality of first slots defining a plurality of third tabs therebetween; and the at least one second slot comprises a plurality of second slots defining a plurality of fourth tabs therebetween.

In a further embodiment of any of the above, the plurality of third tabs comprises a plurality of axially extending third tabs; and the plurality of fourth tabs comprises a plurality of axially extending fourth tabs.

In a further embodiment of any of the above, the at least one first tab comprises at least one radially extending first tab; and the at least one second tab comprises at least one axial second tab that extends axially with respect to the at least one radially extending first tab.

In another embodiment, a gas turbine engine is disclosed comprising: a compressor section, combustion section, turbine section and exhaust section in serial flow communication; a turbine shaft coupling the compressor section and the turbine section, the turbine shaft including at least one first slot; a stack nut threadingly engaged with the turbine shaft and including at least one second slot; a component including at least one first tab and at least one second tab, wherein the at least one first tab is axially offset from the at least one second tab; wherein engagement of the at least one first tab within the at least one first slot, and engagement of the at least one second tab within the at least one second slot, substantially prevents relative rotation between the turbine shaft and the stack nut, between the stack nut and the component, and between the turbine shaft and the component.

In a further embodiment of the above, the component comprises a pawl carrier.

In a further embodiment of any of the above, the at least one first slot comprises a plurality of first slots; the at least one second slot comprises a plurality of second slots; the at least one first tab comprises a plurality of first tabs; the at least one second tab comprises a plurality of second tabs; each of the plurality of first tabs is disposed in a respective one of the plurality of first slots; and each of the plurality of second tabs is disposed in a respective one of the plurality of second slots.

In a further embodiment of any of the above, the at least one first slot comprises a plurality of first slots defining a plurality of third tabs therebetween; and the at least one second slot comprises a plurality of second slots defining a plurality of fourth tabs therebetween.

In a further embodiment of any of the above, the plurality of third tabs comprises a plurality of axially extending third tabs; and the plurality of fourth tabs comprises a plurality of axially extending fourth tabs.

In a further embodiment of any of the above, the at least one first tab comprises at least one radially extending first tab; and the at least one second tab comprises at least one axial second tab that extends axially with respect to the at least one radially extending first tab.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
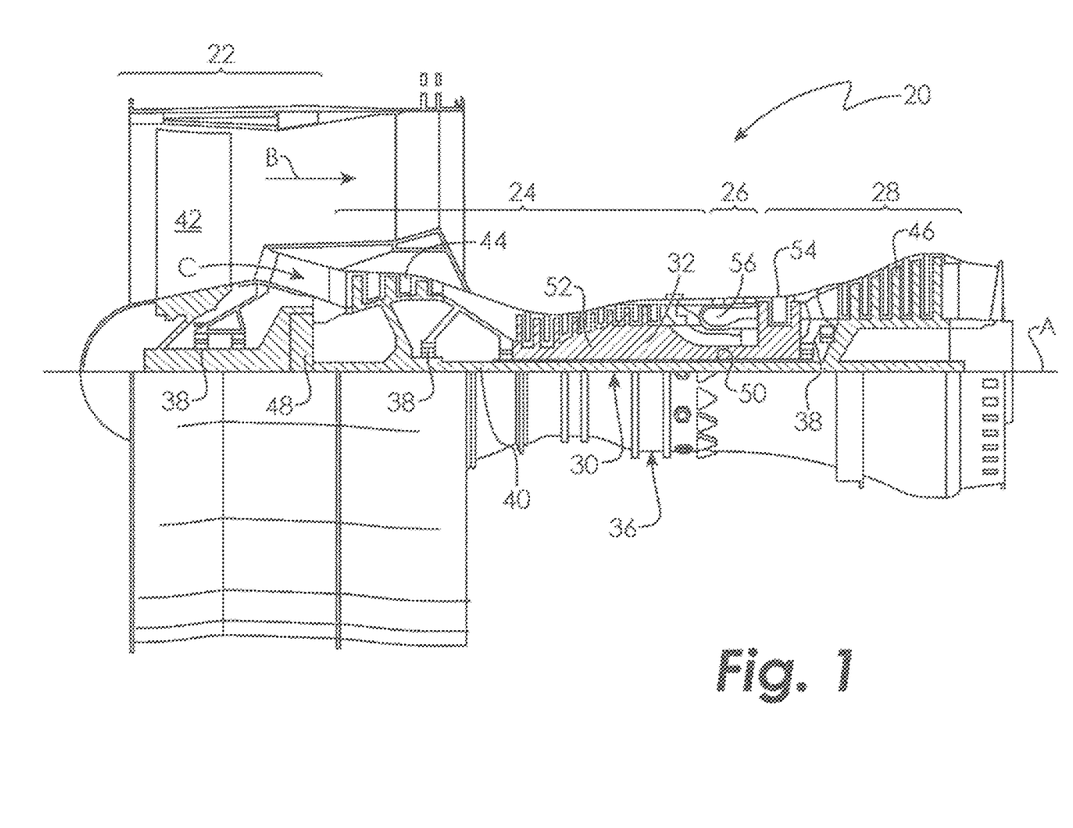
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150 ft/second (350.5 m/sec).

FIGS. 3-6 schematically illustrate an embodiment of an anti-rotation system for a coupling stack comprising multiple rotating components. For purposes of the present disclosure, the term "axial" or "axially offset" refers to a direction along the longitudinal axis of the shaft 102, whereas "radial" refers to a direction perpendicular to the longitudinal axis. As is visible in the cross-section of FIGS. 4 and 6, the stack nut 100 is threadingly engaged with the shaft 102. A component of the coupling stack that is adjacent to the stack nut 100 may be formed with tabs whose geometry allows them to engage corresponding tabs on the stack nut 100 and the shaft 102 to provide anti-rotation between three different components, namely the stack nut 100, the shaft 102, and the adjacent component 200. This arrangement allows the key washer 104 and the snap ring 106 to be eliminated from this location. Instead, the anti-rotation function is accomplished by interaction of the adjacent part in the coupling stack with the stack nut 100 and the shaft 102. In the illustrated embodiment, the adjacent component comprises a pawl carrier of a ratchet and pawl system, but it will be appreciated in view of the present disclosure that the adjacent component may comprise any component of the coupling stack.

The pawl carrier 200 may be formed with at least two tabs, wherein a first one 206 of the at least two tabs engages the slot 110 of stack nut 100 for anti-rotation therebetween, while a second one 208 of the at least two tabs engages the slot 116 of the shaft 102 for anti-rotation therebetween. In one embodiment, the first one 206 of the at least two tabs is axially offset from the second one 208 of the at least two tabs. In one embodiment, the at least two tabs comprise two sets of multiple tabs as shown in the illustrated embodiment.

The pawl carrier 200 may be formed with a first set of tabs 206 that are sized and spaced to be disposed within slots 110 between axial tabs 112 on the stack nut 100. The pawl carrier 200 additionally includes a second set of tabs 208 that are sized and spaced to be disposed within slots 116 between axial tabs 118 on the shaft 102. In one embodiment, the tabs 206 extend radially, while the tabs 208 extend axially with respect to the tabs 206. Interference between the tabs 206 and the axial tabs 112 on the stack nut 100, as well as between the tabs 208 and the axial tabs 118 on the shaft 102, prevents relative rotation between the stack nut 100, the shaft 102, and the pawl carrier 200. In some embodiments, material may be removed from the area 207 aft of the tabs 206 and the area 209 aft of the tabs 208 in order to reduce the weight of the pawl carrier 200

Figure 5:
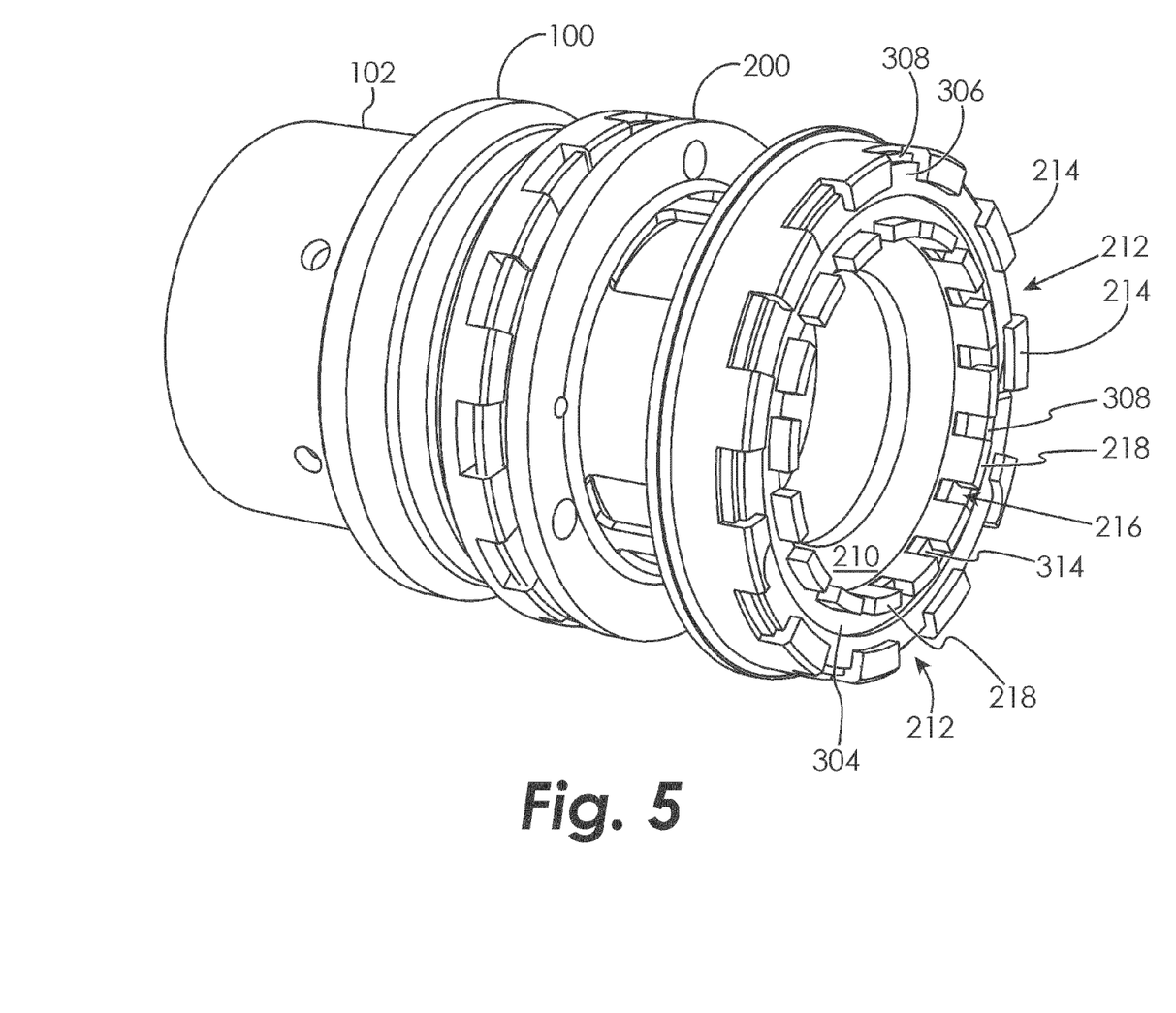
FIG. 5 is a schematic perspective view of a coupling stack component mounted in a coupling stack in an embodiment.
Figure 6:
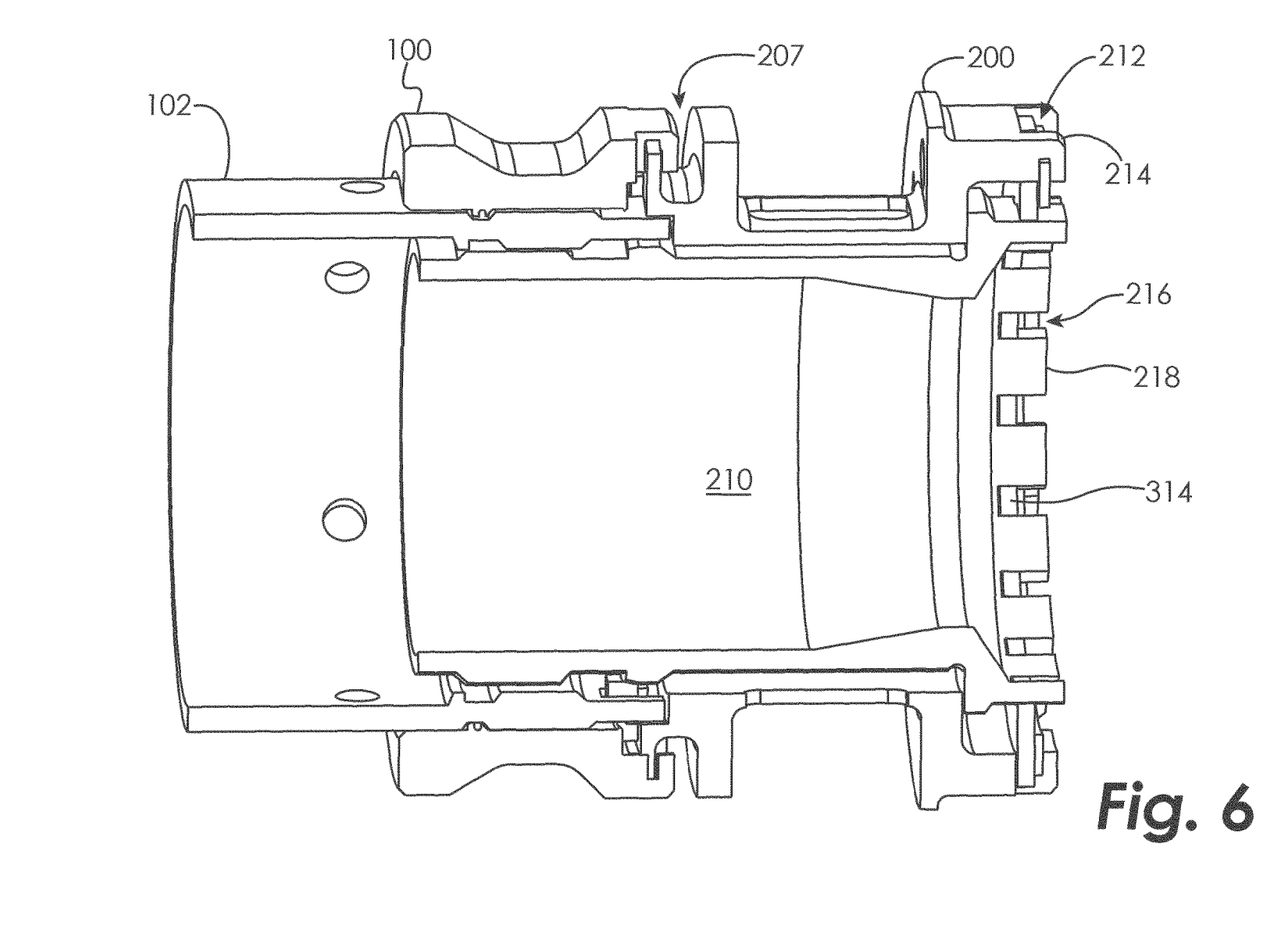
FIG. 6 is a schematic cross-sectional view of a coupling stack component engaged with a shaft, a stack nut, and an internal nut in an embodiment.

As shown in FIGS. 5-6, an internal nut 210 extends within the pawl carrier 200 and threadingly engages the interior surface of the shaft 102 in one embodiment. To provide anti-rotation between the pawl carrier 200 and the internal nut 210, a key washer 304 and snap ring 306 may be deployed between the pawl carrier 200 and the internal nut 210 at the aft end thereof. The key washer 304 includes a plurality of radially outer tabs 308 that are disposed within slots 212 between axial tabs 214 on the pawl carrier 200. The key washer 304 additionally includes radially inner tabs 314 that are disposed within slots 216 between axial tabs 218 on the inner nut 210. Once the key washer 304 is installed such that the radially outer tabs 308 are disposed within the slots 212 and the radially inner tabs 314 are disposed within the slots 216, the snap ring 306 may be installed to prevent the key washer 304 from becoming disengaged from the pawl carrier 200 and the inner nut 210. The snap ring 306 is positioned in cavities adjacent the axial tabs 214. Interference between the radially outer tabs 308 and the axial tabs 214 on the pawl carrier 200, as well as between the radially inner tabs 314 and the axial tabs 218 on the inner nut 210, prevents relative rotation between the pawl carrier 200 and the inner nut 210.

The pawl carrier 200 with the anti-rotation features enables the key washer 104 and snap ring 106 to be eliminated, thereby reducing the hardware count associated with the component stack. Additionally, the elimination of the key washer 104 and snap ring 106 provides more available length of the tabs 112 on the stack nut 100 and the tabs 118 on the shaft 102 for engagement by the pawl carrier tabs 206 and 208, respectively. This increases design robustness and reduces sensitivity to tolerance stack-up.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. An anti-rotation system for a coupling stack of a gas turbine engine, comprising:
   a stack nut including at least one first slot;
   a shaft including at least one second slot, wherein the stack nut threadingly engages the shaft;
   a pawl carrier including at least one first tab and at least one second tab, wherein the at least one first tab of the pawl carrier is axially offset from the at least one second tab of the pawl carrier; and
   wherein relative rotation between the stack nut and the shaft is prevented when the at least one first tab of the pawl carrier is located within the at least one first slot of the stack nut and the at least one second tab of the pawl carrier is located within the at least one second slot of the shaft, and relative rotation between the shaft and the pawl carrier is prevented when the at least one first tab of the pawl carrier is located within the at least one first slot of the stack nut and the at least one second tab of the pawl carrier is located within the at least one second slot of the shaft, and relative rotation between the stack nut and the pawl carrier is prevented when the at least one first tab of the pawl carrier is located within the at least one first slot of the stack nut and the at least one second tab of the pawl carrier is located within the at least one second slot of the shaft.

2. The anti-rotation system of claim 1, wherein the at least one first tab of the pawl carrier has a greater circumferential length with respect to an axis of the shaft than the at least one second tab.

3. The anti-rotation system of claim 1, wherein the at least one second tab extends axially from the at least one first tab.

4. The coupling stack of claim 1, wherein:
the at least one first slot comprises a plurality of first slots;
the at least one second slot comprises a plurality of second slots;
the at least one first tab comprises a plurality of first tabs;
the at least one second tab comprises a plurality of second tabs;
each of the plurality of first tabs is disposed in a respective one of the plurality of first slots when the pawl carrier is adjacent to the stack nut and the shaft; and
each of the plurality of second tabs is disposed in a respective one of the plurality of second slots when the pawl carrier is adjacent to the stack nut and the shaft.

5. The coupling stack of claim 1, wherein:
the at least one first slot comprises a plurality of first slots defining a plurality of third tabs therebetween; and
the at least one second slot comprises a plurality of second slots defining a plurality of fourth tabs therebetween.

6. The coupling stack of claim 5, wherein:
the plurality of third tabs comprises a plurality of axially extending third tabs; and the plurality of fourth tabs comprises a plurality of axially extending fourth tabs.

7. The coupling stack of claim 5, wherein:
the at least one first tab comprises at least one radially extending first tab; and
the at least one second tab comprises at least one axial second tab that extends axially with respect to the at least one radially extending first tab.

8. A gas turbine engine comprising:
a compressor section, combustion section, turbine section and exhaust section in serial flow communication;
a turbine shaft coupling the compressor section and the turbine section, the turbine shaft including at least one first slot;
a stack nut threadingly engaged with the turbine shaft and including at least one second slot;
a component including at least one first tab and at least one second tab, wherein the at least one first tab is axially offset from the at least one second tab;
wherein engagement of the at least one first tab of the component within the at least one first slot of the stack nut, and engagement of the at least one second tab of the component within the at least one second slot of the turbine shaft, substantially prevents relative rotation between the turbine shaft and the stack nut, and engagement of the at least one first tab of the component within the at least one first slot of the stack nut, and engagement of the at least one second tab of the component within the at least one second slot of the turbine shaft, substantially prevents relative rotation between the turbine shaft and the stack nut, and engagement of the at least one first tab of the component within the at least one first slot of the stack nut, and engagement of the at least one second tab of the component within the at least one second slot of the turbine shaft, substantially prevents relative rotation between the stack nut and the component, and engagement of the at least one first tab of the component within the at least one first slot of the stack nut, and engagement of the at least one second tab of the component within the at least one second slot of the turbine shaft, substantially prevents relative rotation between the turbine shaft and the component.

9. The gas turbine engine of claim 8, wherein the component comprises a pawl carrier.

10. The gas turbine engine of claim 8, wherein:
the at least one first slot comprises a plurality of first slots;
the at least one second slot comprises a plurality of second slots;
the at least one first tab comprises a plurality of first tabs;
the at least one second tab comprises a plurality of second tabs;
each of the plurality of first tabs is disposed in a respective one of the plurality of first slots when the component is adjacent to the stack nut and the turbine shaft; and
each of the plurality of second tabs is disposed in a respective one of the plurality of second slots when the component is adjacent to the stack nut and the turbine shaft.

11. The gas turbine engine of claim 8, wherein:
the at least one first slot comprises a plurality of first slots defining a plurality of third tabs therebetween; and
the at least one second slot comprises a plurality of second slots defining a plurality of fourth tabs therebetween.

12. The gas turbine engine of claim 11, wherein:
the plurality of third tabs comprises a plurality of axially extending third tabs; and
the plurality of fourth tabs comprises a plurality of axially extending fourth tabs.

13. The gas turbine engine of claim 12, wherein:
the at least one first tab comprises at least one radially extending first tab; and
the at least one second tab comprises at least one axial second tab that extends axially with respect to the at least one radially extending first tab.

* * * * *